March 28, 1944. N. H. COPP 2,344,972
ANTISKID MEANS FOR VEHICLE WHEELS
Filed June 18, 1942 3 Sheets-Sheet 1
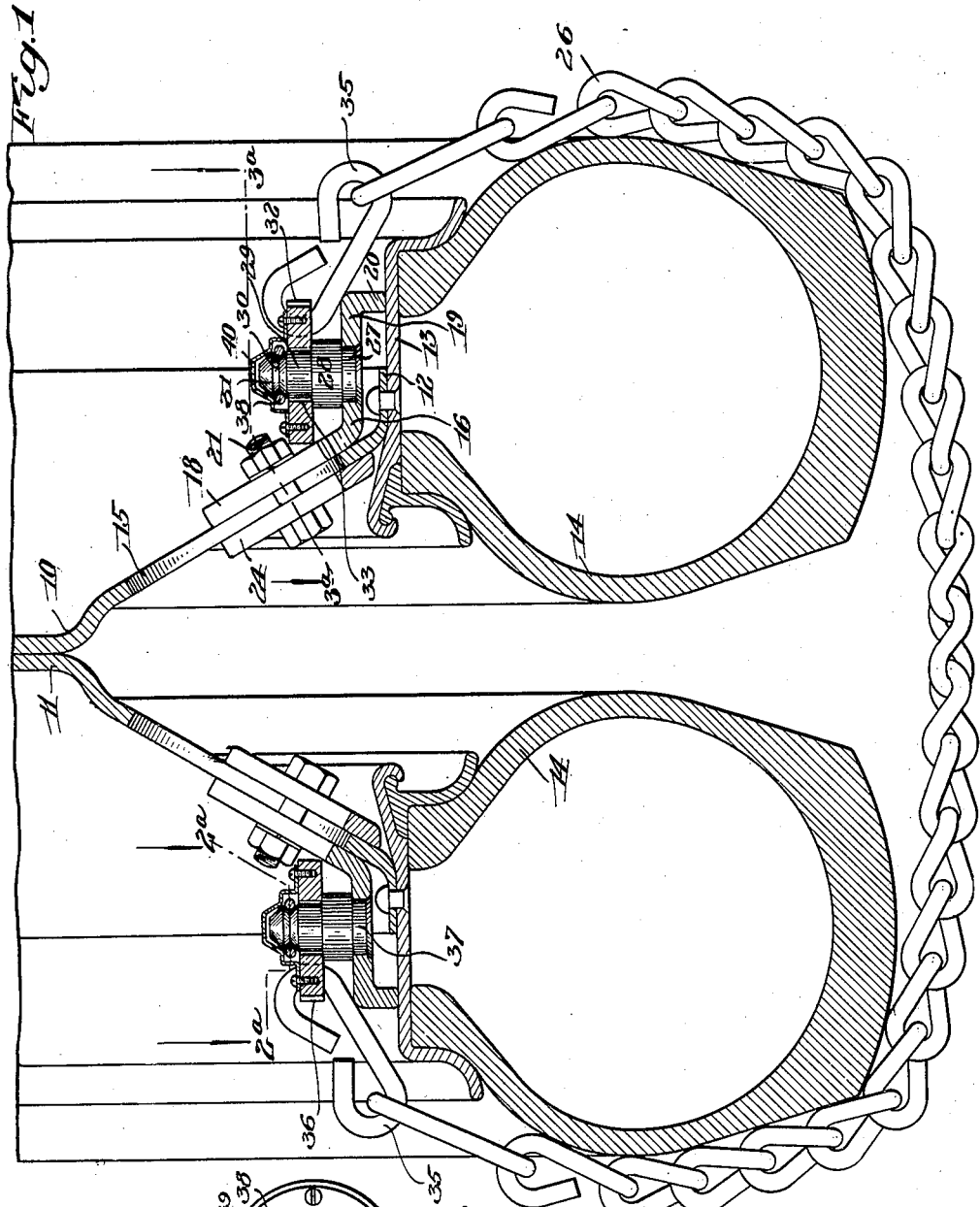
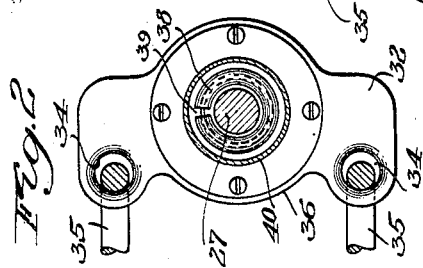
INVENTOR.
Nelson H. Copp
BY Cumpston & Shepard
his Attorneys March 28, 1944. N. H. COPP 2,344,972
ANTISKID MEANS FOR VEHICLE WHEELS
Filed June 18, 1942 3 Sheets-Sheet 2
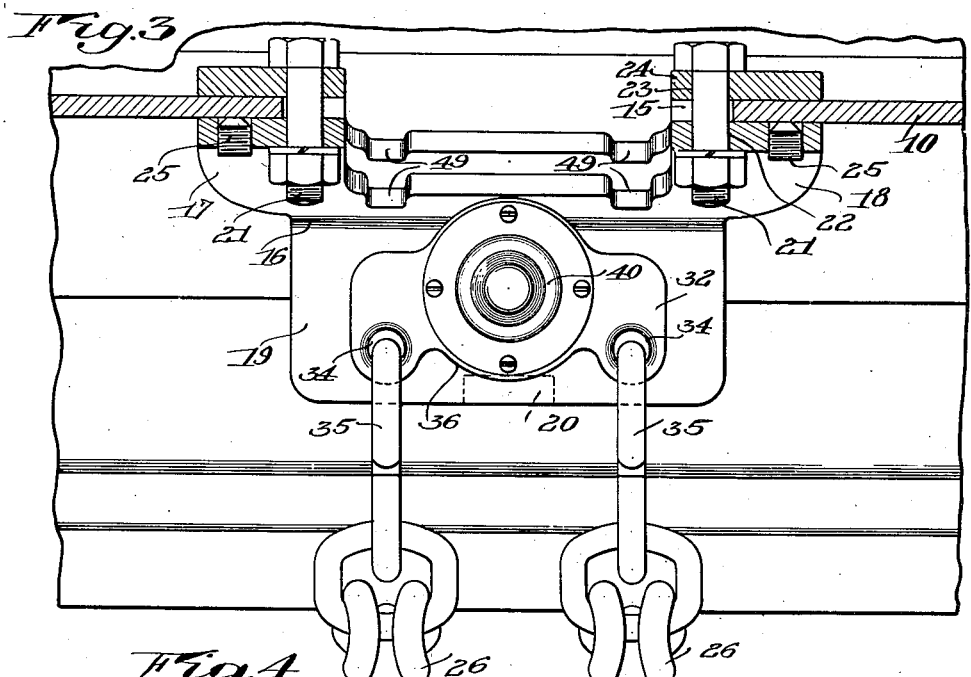
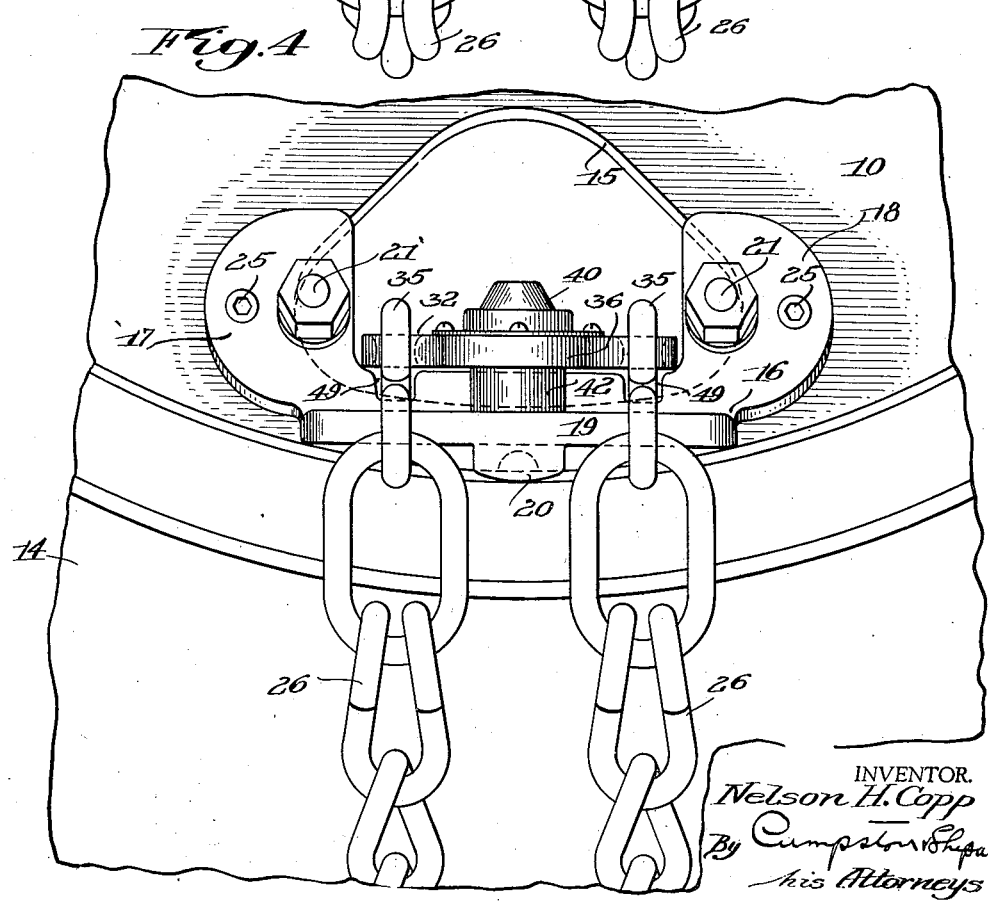
INVENTOR.
Nelson H. Copp
By Cumpston Shepard
his Attorneys

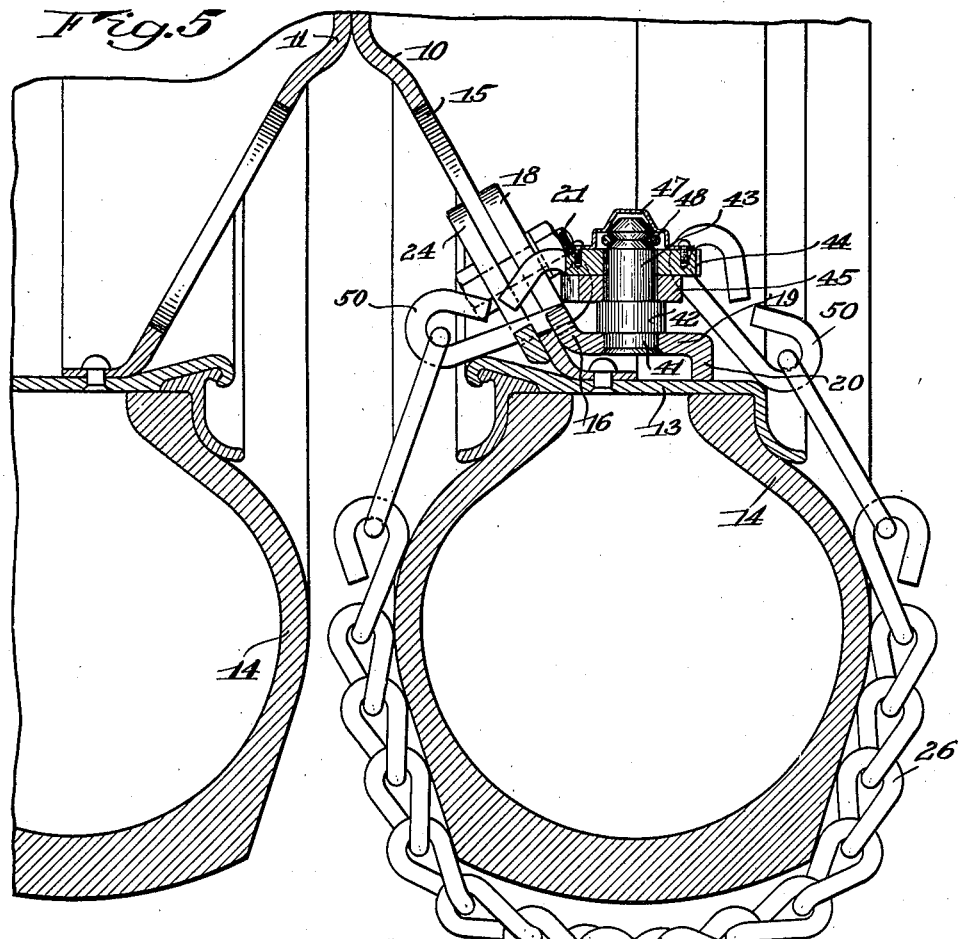
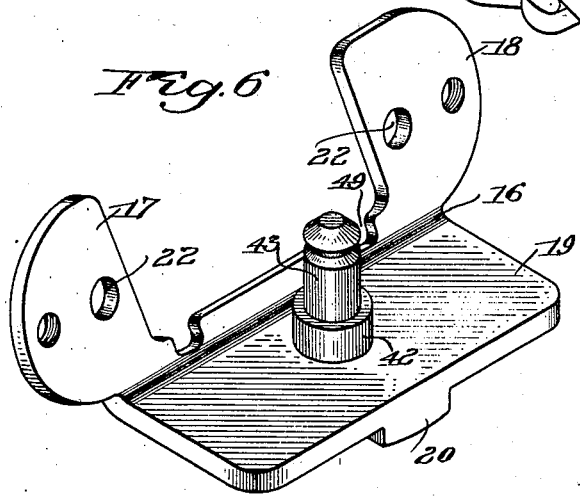
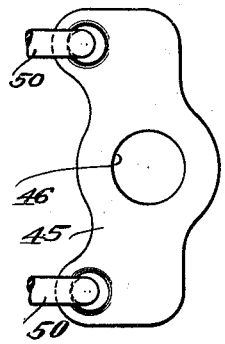

Patented Mar. 28, 1944

2,344,972

UNITED STATES PATENT OFFICE 2,344,972

ANTISKID MEANS FOR VEHICLE WHEELS

Nelson H. Copp, Rochester, N. Y., assignor of one-half to Harold J. Nagle and one-half to Reginald A. Nagle, both of Rochester, N. Y.

Application June 18, 1942, Serial No. 447,514

5 Claims. (Cl. 152—233)

This invention relates to antiskid means for the tires of vehicle wheels. While the known antiskid chains of the "full," or standard variety, comprising side chains extending circumferentially on opposite sides of the wheel and connected intermittently by chains extending across the tread of the tire, have afforded an efficient traction grip for the tire on the road, such chains have not been entirely satisfactory, because the considerable labor of attaching them and removing them and the attendant soiling of the hands and clothing of the driver, have often prevented the use of the chains when actually required by driving conditions.

It has been proposed to employ instead one or more separate cross chains, or groups of cross chains, at one or more points spaced circumferentially about the wheel, and attached directly to the felly or rim portion of the wheel. Such wheels commonly have openings in the disk adjacent the felly to permit the felly and tire to be encircled by such cross chains, but such mode of application of the cross chains has usually involved some difficulty in securing the chains, as well as a tendency of the chains to shift in the opening and mar the felly and rim portions of the wheel. One object of the invention is to provide, for such wheels, a more simple, efficient, and convenient means for easily and quickly attaching one or more cross chains.

Another object is to provide an antiskid device of the above character having means for gripping the wheel in a form of construction which is economical to manufacture and capable of being readily and securely fastened to the wheel and used without injury to the wheel finish.

A further object is to provide such a device capable of being easily, conveniently and quickly manipulated to apply and remove the cross chains, as conditions may require, with a minimum of soiling of the hands and clothing of the driver, so as to encourage the use of such antiskid means and promote the safety of the driving public.

To these and other ends the invention resides in certain improvements and combinations of parts, all as will be hereinafter more fully described, the novel features being pointed out in the claims at the end of the specification.

In the drawings:

Fig. 1 is a sectional elevation taken transversely through a vehicle wheel having the invention applied thereto;

Fig. 2 is an enlarged, sectional view substantially on the line 2a—2a in Fig. 1;

Fig. 3 is a view substantially on the line 3a—3a in Fig. 1;

Fig. 4 is a side elevation of the parts shown in Fig. 3;

Fig. 5 is a view similar to Fig. 1, partly broken away, showing a modified construction;

Fig. 6 is an enlarged perspective view of parts of the bracket for attachment to the wheel, and Fig. 7 is a top plan view of one of the members for anchoring the chain ends on the bracket.

The invention is disclosed, in the present instance, by way of illustration, as applied to a disk-type, double truck wheel mounting two tires. Referring first to the modification shown in Fig. 1, the two wheel disks are shown at 10 and 11, extending parallel with each other adjacent the hub of the wheel but diverging adjacent the periphery, as shown, to space the felly, rim and tire portions. The felly of each wheel is provided by an outwardly turned flange portion 12 to which is fixed in any suitable manner a rim 13 on which is received a tire 14, this being a common type of wheel, as well understood in the art. Disk wheels have been commonly constructed with a number of openings therethrough, spaced around the circumference, through which, heretofore, antiskid chains have been inserted and secured around the felly and rim and across the tread of the tire, and the present invention is herein disclosed as adapted to such type of wheel, to provide an improved construction for attaching the chains.

The means for attachment to the wheel for securing the cross chains thereon comprises, preferably, a bracket indicated generally at 16, Figs. 1 and 6, having a clamping part, preferably in the nature of two spaced wings 17 and 18, and a supporting part 19, the clamping part wings being inclined to the supporting part so as to lie against the outer face of the disk, as shown, with the wings on opposite sides of the disk opening 15. The supporting part 19 preferably extends normally to the plane of the wheel and substantially parallel with the bottom of the rim 13, as shown, with a radially extending lug 20 adapted to engage and rest upon the bottom of rim 13.

The means for securing bracket 16 to the wheel disk comprises preferably a pair of bolts 21, Fig. 3, extending through openings 22 in the clamping part wings 17—18, and through opening 15 in the disk, and through openings 23 in the clamping plate 24, located on the opposite face of the disk. Clamping plate 24 is preferably of the same general shape as the angular clamping part of bracket 16, comprising wings similar to the wings 17 and 18 connected at their bases and spaced apart so as to lie on opposite sides of the disk opening 15. Such wings of both the clamping part and the clamping plate, however, overlap the ends of opening 15, as shown in Figs. 3 and 4, so that the bolts 21, while passing through the opening 15, will engage in the openings in the wings and draw the same together on opposite sides of the wheel disk, thus clamping the bracket to the disk, with lug 20 of supporting part 19 resting on the bottom of the rim, to hold the part 19 elevated to clear the felly. The bracket clamping part and the clamping plate are preferably further fixed to the wheel disk, as by means of set screws 25, Figs. 3 and 4, threadedly engaged in openings in the bracket clamping part and having their ends screwed tightly against the surface of the disk to increase the frictional engagement therewith.

The means for attaching the ends of the traction increasing elements or cross chains 26 to the bracket 16 comprises preferably a lug 27 securely mounted at one end in the bracket supporting part 19 and projecting radially inward therefrom. In the present instance, the lug is of generally cylindrical shape with varying diameter, having preferably an enlarged base portion 28 above which is a reduced cylindrical portion 29 for the reception of the anchoring member of the cross chain. Above portion 29 the lug is formed with a circumferential groove 30 providing by its outer side a laterally projecting shoulder 31. The extremity of the lug is beveled or tapered to produce a somewhat pointed shape, as shown, all for purposes to be presently described.

The means for anchoring the cross chain ends comprises, preferably, an anchoring member, or bar, 32, having centrally therein a circular opening 33 adapted to receive the portion 29 of the lug, with the member 32 seated on the enlarged portion 28 of the lug, as shown in Fig. 1. Member 32 is provided at its outer ends with openings 34 in which are engaged the terminal links 35 of a pair of cross chains 26, the anchoring member being thus arranged in the present instance to carry a pair of adjacent cross chains. In the arrangement shown in Fig. 1, each lug receives one anchoring member for one end of each chain, the pair of chains being carried across both tires of the double wheel, with their opposite ends secured to a similarly constructed anchoring member 36 on a similar lug 37 attached by similar bracket means to the other disk 11, the construction being the same on each of the two disks.

The means for detachably securing each anchoring member on its lug comprises a resilient means, preferably a spring ring 38, Figs. 1 and 2, having therein a gap 39 to permit the ring to contract and expand. The ring is of such size as to closely embrace lug 27 in its recess 30, so that the ring may be expanded by pressure longitudinally of the lug to snap over the inclined sides of the lug shoulder 31. For this purpose the ring is loosely retained in a sheet metal housing 40, fixed on the outer face of the anchoring member. The central, dome-shaped portion of the housing is of sufficient height to clear the upper end of lug 27 when inserted through the anchoring member, but the outer portion of the housing, of less height but greater diameter, loosely retains the ring concentric with the opening 33 in the anchoring member in position for cooperation with the lug 27, as described.

It will be apparent from this construction that the anchoring member may be impaled upon the lug with the latter received in the opening 33 of the member and that mere downward pressure of the member, to its seat on base portion 28 of the lug, serves to snap the spring ring 38 over the shoulder 31 and into recess 30 of the lug to hold the member thereon. Similarly, upward pressure on the member serves to snap the ring over the lug shoulder and release the member for removal from the lug. It will be noted that housing 40 is closed so as to protect the parts against mud and ice and maintain them in efficient working condition. The normal tension on the cross chains, resulting from centrifugal force and the tractive pull, tends to hold each anchoring member on its lug. The spring engagement of each member with its lug is sufficient to retain the member in place against any normal pressures in the opposite direction which might tend to displace the member from the lug, but each member may be easily and quickly removed by merely pressing it upwardly off the end of its lug. This pressure actuated device for releasably securing the cross chain anchoring member to the lug on the rim is disclosed and claimed in my copending application, Serial No. 447,512, filed June 18, 1942.

In Figs. 5 and 7 is shown a slightly modified construction in which each cross chain embraces a single tire. In this arrangement the construction of the bracket and its attachment to the wheel disk are the same as described above, except that the bracket lug 41 has above its seat portion 42, a portion 43 of substantially twice the longitudinal extent of the corresponding part in the modification previously described. Two anchoring members 44 and 45 are impaled upon the lug, one upon another, as shown, and each carrying the ends of a pair of cross chains. The lower member 45, as shown in Fig. 7, has merely an unobstructed opening 46 for engagement over the lug, while the other member 44 is provided with a housing 47 and a spring retaining ring 48, as described in connection with the previous modifications, the upper anchoring member serving to yieldingly retain both in place on the lug. The bracket clamping part and clamping plate, in this modification, as in the previous one, are preferably notched as at 49, to receive the terminal link 50 at one end of each cross chain which is passed through the opening 15 of the disk to facilitate engagement of the link with the lower anchoring member 45, as shown. It will be obvious that this modification is one adapted for use also with disk wheels of the single type for receiving a single tire.

The operation of the device will be apparent from the above description and it will be seen that the invention accomplishes its objects. The brackets are readily and securely fixed to the wheel disk and felly and once inserted, may thereafter be left in place on the wheel. Whenever road conditions require, the anchoring members of the cross chains may be easily and quickly impaled upon the bracket lugs after clearing the latter, if necessary, of any accumulation of mud or ice. The spring retaining means of each anchoring member is protected by its housing as described. As this operation merely requires, in each instance, the placing of one or a pair of chains across the tread of the tire and the impaling and pressing down of the chain anchoring members on the bracket lugs, the operation may be readily performed with a minimum of soiling of the driver and such ease of application encourages the use of the chains under all conditions in which they add to the safety of travel.

While the invention has been disclosed in connection with preferred modifications, such disclosure is intended by way of illustration, rather than by way of limitation, as it is contemplated that various changes in the construction and arrangement of the parts will readily occur to those skilled in the art within the spirit of the invention and the appended claims.

I claim:

1. In an antiskid tire chain for a vehicle wheel of the disk type, a bracket having a clamping part provided with means for attaching the same to the disk portion of said wheel, a supporting part extending at an angle to said clamping part for engagement with the felly portion of said wheel, and a lug on said supporting part for attachment to the end of a traction increasing element extended across a tire on said wheel.

2. In an antiskid tire chain for a vehicle wheel of the disk type having an opening therethrough adjacent the felly portion of said wheel, a bracket having a clamping part for engagement with one face of said disk, a clamping plate for engagement with the opposite face of said disk, bolt means for clamping said plate and clamping part together through said disk opening, a supporting part on said bracket for engaging the felly portion of said wheel, and a lug on said supporting part for attachment to the end of a traction increasing element extended across a tire on said wheel.

3. In an antiskid tire chain for a vehicle wheel of the disk type having an opening therethrough adjacent the felly portion on said wheel, a bracket having a clamping part for engagement with one face of said disk, a clamping plate for engagement with the opposite face of said disk, said clamping part and plate having openings therethrough registering with said opening in said disk, bolt means extending through said disk opening and said openings in said clamping part and plate for clamping the same to said disk, a supporting part on said bracket for engaging the felly portion of said wheel, and a lug on said supporting part for attachment to the end of a traction increasing element extended across a tire on said wheel.

4. In an antiskid tire chain for a vehicle wheel of the disk type having an opening therethrough adjacent the felly portion on said wheel, a bracket having a clamping part for engagement with one face of said disk, a clamping plate for engagement with the opposite face of said disk, said clamping part and plate having openings therethrough registering with said opening in said disk, bolt means extending through said disk opening and said openings in said clamping part and plate for clamping the same to said disk, a supporting part on said bracket for engaging the felly portion of said wheel, a lug on said supporting part, an anchoring member for the end of a traction increasing element extended across a tire on said wheel, and cooperating parts on said lug and member for releasably securing said member on said lug and said element on said wheel.

5. In an antiskid tire chain for a vehicle wheel of the disk type having an opening therethrough adjacent the felly portion of said wheel, a bracket having a clamping part for engagement with one face of said disk, a clamping plate for engagement with the opposite face of said disk, bolt means for clamping said plate and clamping part together through said disk opening, a supporting part on said bracket for engaging the felly portion of said wheel, a lug on said supporting part opposite said opening, a pair of anchoring members for attachment to the respective ends of a traction increasing element extended across a tire on said wheel and through said opening, and cooperating parts on said lug and members for releasably securing said members separately to said lug.

NELSON H. COPP.